(12) United States Patent
Fan et al.

(10) Patent No.: US 7,318,867 B1
(45) Date of Patent: Jan. 15, 2008

(54) PRODUCING COVER LAYERS IN OPTICAL DISCS

(75) Inventors: Kai Leung Fan, Hong Kong (CN); Ming Sang Yeung, Hong Kong (CN)

(73) Assignee: Anwell Precision Technology (HK) Ltd, Hong Kong (HK)

( * ) Notice: Subject to any disclaimer, the term of this patent is extended or adjusted under 35 U.S.C. 154(b) by 76 days.

(21) Appl. No.: 11/198,118

(22) Filed: Aug. 5, 2005

Related U.S. Application Data

(63) Continuation-in-part of application No. 11/182,687, filed on Jul. 15, 2005.

(51) Int. Cl.
  *B05C 11/02* (2006.01)
  *B05C 11/00* (2006.01)
  *B05B 5/00* (2006.01)

(52) U.S. Cl. .................. 118/52; 118/641; 118/642; 118/666

(58) Field of Classification Search .................. 118/52, 118/612, 319, 320, 302, 56–58, 641–643, 118/300, 323, 62–63, 666; 264/1.33, 1.37; 427/240–241, 407.1, 425, 162, 282, 130; 428/64.1–64.6; 369/283
See application file for complete search history.

(56) References Cited

U.S. PATENT DOCUMENTS

| 6,025,012 A | * | 2/2000 | Matsuda et al. | ............... 427/9 |
| 6,497,925 B1 | * | 12/2002 | Chen et al. | ................. 427/515 |

FOREIGN PATENT DOCUMENTS

| JP | 10289489 A | * | 10/1998 |
| JP | 11165114 A | * | 6/1999 |

OTHER PUBLICATIONS

English translated Abstract of JP-11-165114.*
English Translated Abstract of JP-10-289489.*

* cited by examiner

*Primary Examiner*—Yewebdar Tadesse
(74) *Attorney, Agent, or Firm*—Joe Zheng

(57) ABSTRACT

Techniques for a cover layer with uniform thickness are disclosed. The cover layer is formed with a type of material, such as glue, in hardened form. In one embodiment, a certain amount of the material in liquid form is dispensed onto a dispensing structure. After the dispensing structure is engaged to hold a disc, the dispensing structure and the disc as a whole unit is rotated at a predefined speed. While the dispensed material on the dispensing structure is being dispersed evenly onto the surface of the disc as result of the centrifugal force, a heater is employed to retain or control the temperature of the dispensed material so that the flow of the dispensed material outwards can be effectively controlled to form a cover layer of uniform thickness on the disc.

25 Claims, 9 Drawing Sheets

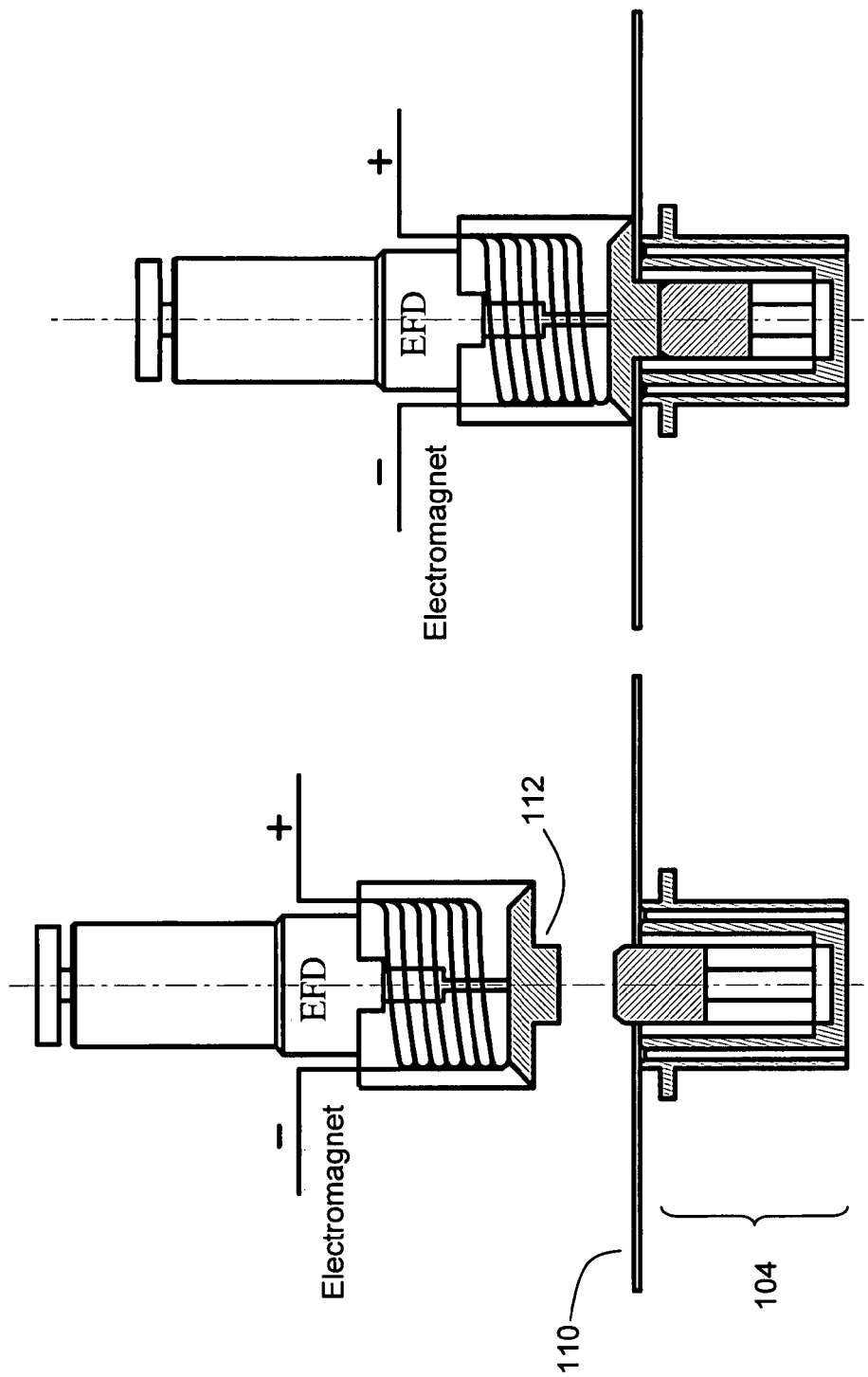

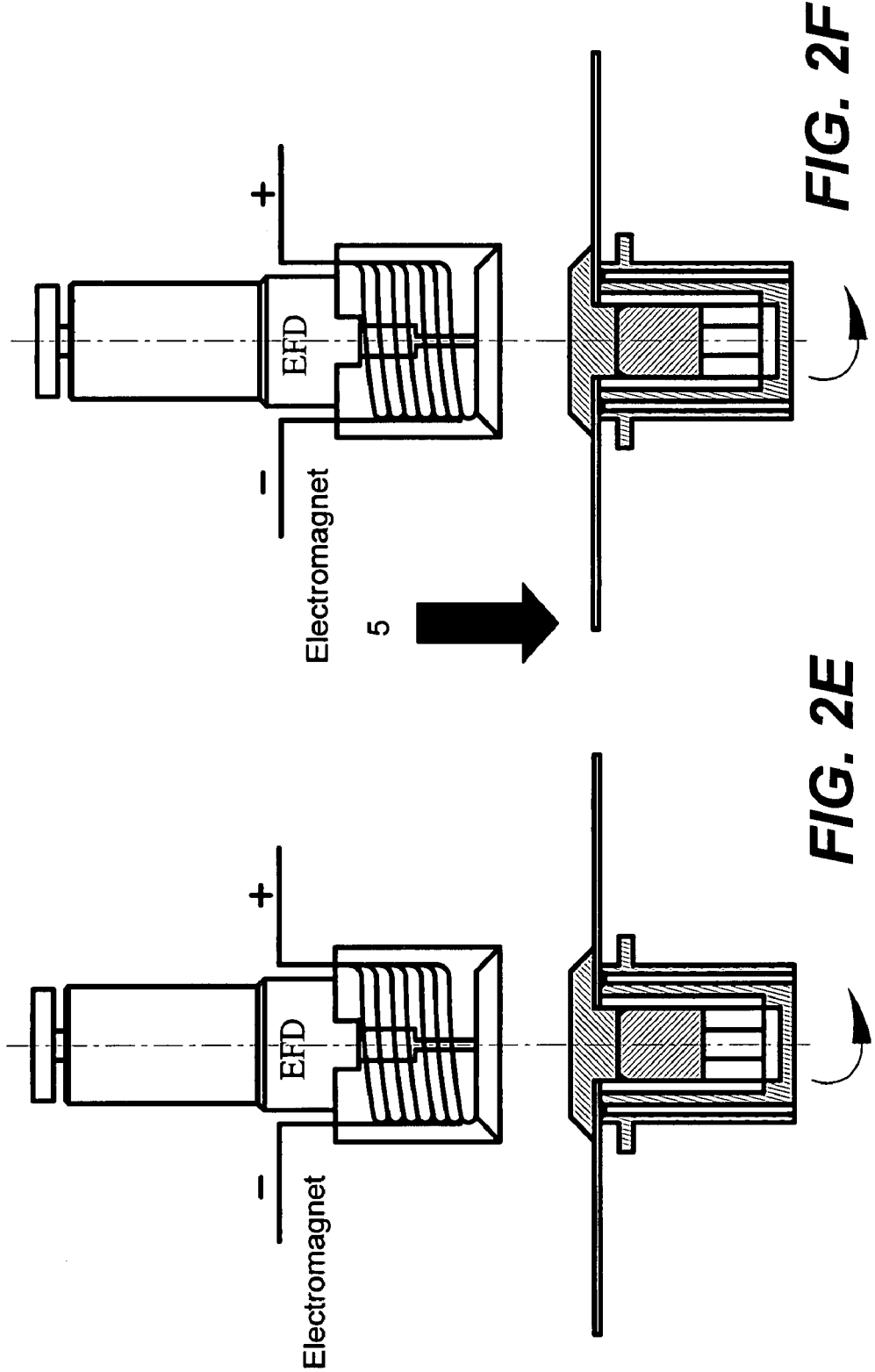

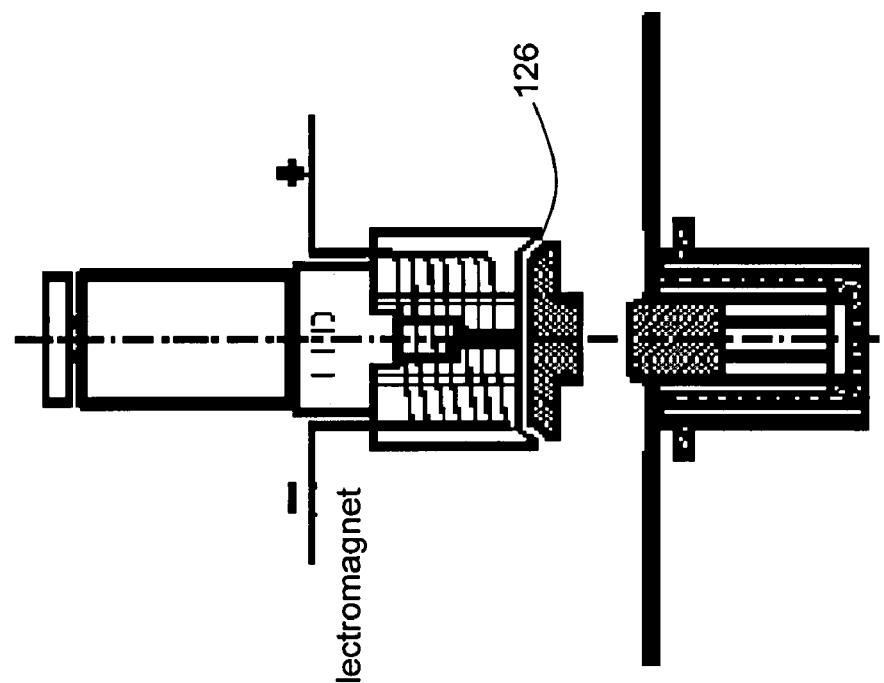
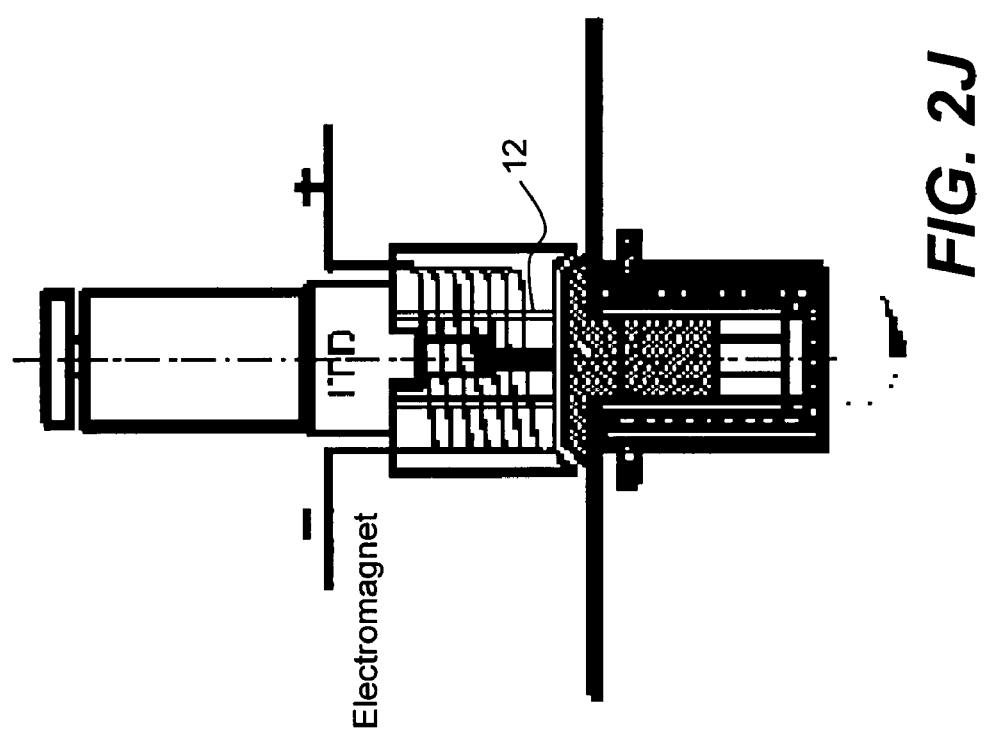
FIG. 2K
FIG. 2J

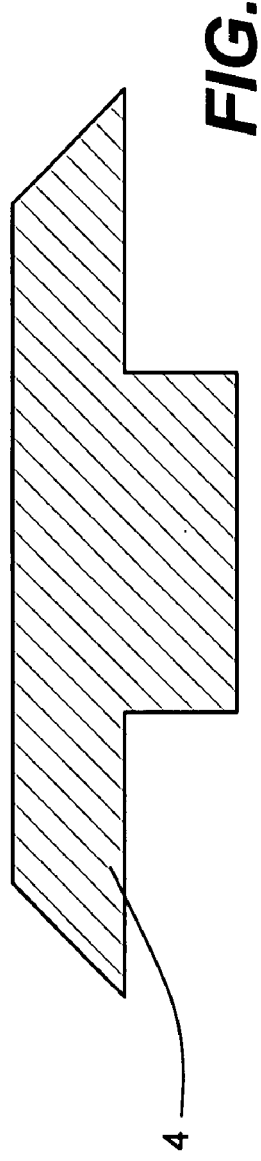
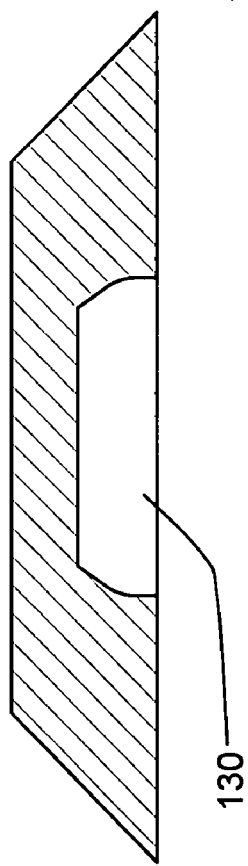
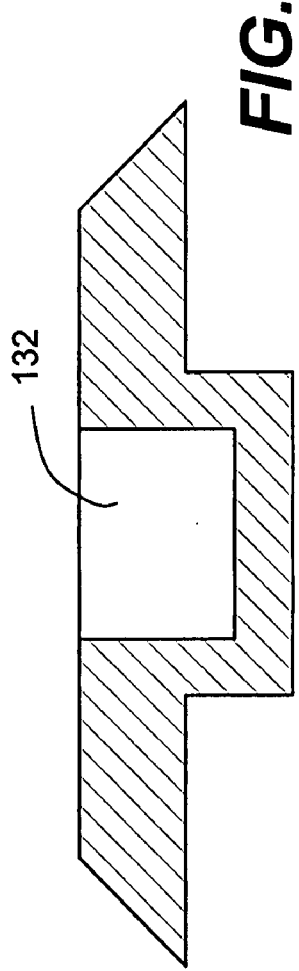
FIG. 3A
FIG. 3B
FIG. 3C

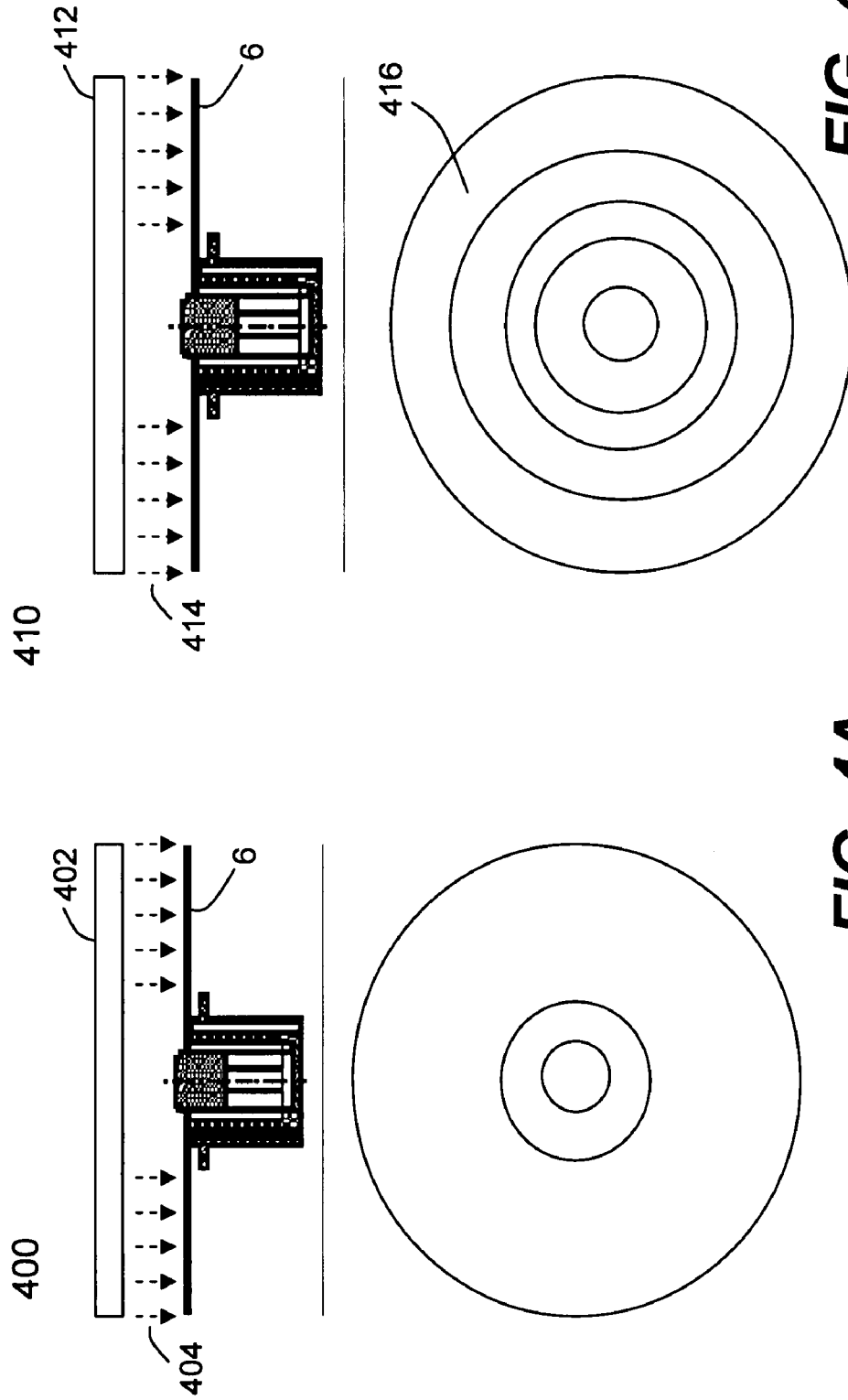

PRODUCING COVER LAYERS IN OPTICAL DISCS

CROSS-REFERENCE TO RELATED APPLICATION

This is a continuation-in-part of co-pending U.S. application Ser. No. 11/182,687, entitled "Method and apparatus for producing cover layers in Blu-ray discs", filed Jul. 15, 2005 and by at least one of the co-inventors herein.

BACKGROUND OF THE INVENTION

1. Field of the Invention

The invention is generally related to the area of optical information recording medium. More particularly, the present is related to techniques for providing a cover layer on a Blu-ray disc, wherein the cover layer is produced with substantial even-thickness.

2. The Background of Related Art

Blu-ray, also known as Blu-ray Disc (BD) is the name of a new-generation optical disc format jointly developed by the Blu-ray Disc Association (BDA), a group of leading consumer electronics and PC companies (including Apple, Dell, Hitachi, HP, JVC, LG, Mitsubishi, Panasonic, Pioneer, Philips, Samsung, Sharp, Sony, TDK and Thomson). The format was developed to enable recording, rewriting and playback of high-definition video (HD), as well as storing large amounts of data. A single-layer Blu-ray Disc can hold 25 GB, which can be used to record over 2 hours of HDTV or more than 13 hours of standard-definition TV. There are also dual-layer versions of the discs that can hold 50 GB.

While current optical disc technologies such as DVD, DVD±R, DVD±RW, and DVD-RAM use a red laser to read and write data, the new format uses a blue-violet laser instead, hence the name Blu-ray. Despite the different type of lasers used, Blu-ray products can easily be made backwards compatible through the use of a BD/DVD/CD compatible optical pickup and allow playback of CDs and DVDs. The benefit of using a blue-violet laser (405 nm) is that it has a shorter wavelength than a red laser (650 nm), which makes it possible to focus the laser spot with even greater precision. This allows data to be packed more tightly and stored in less space, so it's possible to fit more data on the disc even though it's the same size as a CD/DVD. This together with the change of numerical aperture to 0.85 is what enables Blu-ray Discs to hold 25 GB/50 GB.

Blu-ray discs can be read at a blue-violet laser ($\lambda$=405 nm) with a numerical aperture (NA) being 0.85. However, the increase of the NA value may effectively reduce the value of the thickness of the optical path that is denoted by t, defocus is proportional to $NA^2/\lambda$, the disc tilt tolerance is according to $\lambda/(t \times NA^3)$ and the thickness variation tolerance of the optical path is $\lambda/NA^4$. So it is generally concluded that the situation can be handled by controlling the error of that length and by decreasing the residual focus error. A simple calculation leads to the conclusion that around 0.1 mm thick of optical path and a few microns of error will guarantee compatible detection tolerances in the Blu-ray disc system to those in the conventional systems.

The cover layer formation is one of the characteristic processes in mass production of the Blu-ray discs. In general, a 0.1 mm-thick cover layer is placed on top of 1.1 mm-thick substrate. This appears one way that the physical specifications required by the format may be satisfied. However, the value of t is so small, the flatness requirement of the cover layer is of extremely high. Various manufacturing methods have been proposed how to generate a cover layer of 0.1 mm uniform thickness and place such a cover layer on a 1.1 mm-thick substrate.

One of the manufacturing methods to produce a cover layer is by spin coating of lacquer. Because of the inherent spinning characteristics in the manufacturing method, it is noted that it is very difficult to create a cover layer of 0.1 mm uniform thickness. To control the flow of the lacquer, an additional apparatus is provided to guide the flow of the lacquer. However, it is noted that, as the lacquer is spun outwards, the characteristics of the lacquer could cause that a certain level of jaggedness, likely the cover layer is thicker in the middle than in the edge area. In addition, the lacquer is typically cured by UV lighting. In the curing process, the lacquer in the edge are tends to shrink towards the middle. As a result, the thickness of the cover layer becomes non-uniform.

Thus there has been a great need for techniques of providing uniform cover layer of a specified thickness onto a disc.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to techniques for providing a cover layer on an optical disc. According to one aspect of the present invention, a cover layer with uniform thickness is produced onto an optical disc. The cover layer is formed with a type of material, such as glue, in hardened form. According to another aspect of the present invention, a certain amount of the material in liquid form is dispensed onto a dispensing structure. After the dispensing structure is engaged to hold the disc, the dispensing structure and the disc as a whole unit is rotated at a predefined speed. While the material dispensed on the dispensing structure is being dispersed evenly onto the surface of the disc as result of the centrifugal force, a heater is employed to retain or control the temperature of the dispensed material so that the flow of the dispensed material outwards can be effectively controlled to form a cover layer of uniform thickness on the disc. One of the key features in the present invention is that the material to form the cover layer is started from the dispensing structure that is so shaped that the material can be evenly dispersed onto the surface of the disc. According to another aspect of the present invention, the heater operates to radiate infrared beams at one or more wavelengths suitable for being absorbed by the material. Depending on the characteristics of the material or glue, the heater is configured to radiate infrared beams in different magnitudes across the disc. As a result, a temperature for each of circular regions of the disc is controlled by the heater such that the material in each of the circular regions is kept in substantially similar temperature. According to still another aspect of the present invention, a curing process (e.g., using UV lighting) is started to cure the material near the outer area of the disc to prevent the dispersed material from shrinking towards the center of the disc. According to yet another aspect of the present invention, air pipes are used to supply air to blow off residuals on the dispensing structure, wherein the air also acts as an air cushion for the dispensing structure when the dispensing structure is treated or gripped again. Depending on implementation or the characteristics, the dispensing structure may be shaped accordingly.

There are numerous functions, benefits and advantages in the present invention, one of them is that the present invention provides techniques for providing a cover layer in a disc, wherein the cover layer has a uniform thickness across the disc. The present invention may be implemented in numerous forms including software and hardware as method, process, or apparatus. According to one embodiment of the present invention, the present invention is an apparatus for providing a cover layer in an optical disc, the apparatus comprises an upper part including a dispensing structure, a lower part including a disc positioning structure and a heater. When one of the upper part and the lower part is caused to move towards the other one of the upper part and the lower part, the dispensing structure is released to engage the disc placed on the disc positioning structure, a certain amount of a type of material in liquid form and at a predefined temperature is dispensed onto the dispensing structure, and the disc is then caused to rotate at a predefined speed so that the material is dispersed evenly onto a surface of the disc by a centrifugal force. The heater employed to control the temperature of the material so that the cover layer of uniform thickness is formed on top of the disc.

According to another embodiment of the present invention, the present invention is an apparatus for providing a cover layer in an optical disc, the apparatus comprises an upper part including means for producing an electromagnetic field and a dispensing structure, the electromagnetic field, when produced, being strong enough to grip the dispensing structure, a lower part including a disc positioning structure, and a heater. When the upper part is caused to move towards the lower part so that the dispensing structure is released to engage the disc placed on the disc positioning structure, a certain amount of glue is then dispensed onto the dispensing structure. The lower part is caused to rotate at a predefined speed so that the glue is dispersed evenly onto a surface of the disc by a centrifugal force. The heater is employed to control the temperature of the material so that the material is spread in a controlled manner onto the disc; and a UV lighting fixture is also provided to cure the glue near outer areas of the disc to prevent the glue from shrinking towards a center of the disc.

One of the objects, features, and advantages of the present invention is to provided techniques for producing a cover layer with uniform thickness in an optical disc.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2A-FIG. 2H show respective aspects of the operation of the configuration in FIG. 1 according to one embodiment;

FIG. 2J shows that air pipes are used to project the air onto the glue dispending structure;

FIG. 2K shows that the air from the air pipes provides an air buffer to avoid the contact of the glue dispending structure with an upper part designed to grip and release the glue dispending structure;

FIG. 3A shows an enlarged view of the glue dispending structure used in FIG. 2A-FIG. 2K;

FIG. 3B shows a second embodiment of the glue dispending structure;

FIG. 3C shows a modified glue dispending structure in which a reservoir is provide to supply an additional amount of glue to ensure that there is always sufficient glue to be dispersed evenly onto a disc in accordance with a thickness requirement;

FIG. 4A shows an embodiment including a heater to retain or control the temperature of a type of material or glue used to form a cover layer; and FIG. 4B shows an embodiment in which a heater is configured to radiate infrared beams in different magnitude across a disc so that when the glue is spread across circular regions on a disc, the glue can be kept in different temperatures.

DETAILED DESCRIPTION OF THE PREFERRED EMBODIMENTS

The present invention pertains to techniques for producing Blue-ray optical discs. According to one aspect of the present invention, a cover layer with uniform thickness is produced onto an optical disc. The cover layer is formed with a type of material, such as glue, in hardened form. According to another aspect of the present invention, a certain amount of the material in liquid form is dispensed onto a dispensing structure. After the dispensing structure is engaged to hold a disc, the dispensing structure and the disc as a whole unit to be rotated with a predefined speed. The dispensed material on the dispensing structure is dispersed evenly onto the surface of the disc as result of the centrifugal force. One of the key features in the present invention is that the material to form the cover layer is started from the dispensing structure that is so shaped that the material can be evenly dispersed onto the surface of the disc. According to still another aspect of the present invention, a curing process (e.g., using UV lighting) is started to cure the material on the edge of the disc to prevent the dispersed material from shrinking. Other aspects of the present invention may be appreciated in the following detailed description.

The detailed description of the present invention is presented largely in terms of procedures, steps, logic blocks, processing, or other symbolic representations that directly or indirectly resemble the operations of devices or systems that can be used on networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Figure 1:
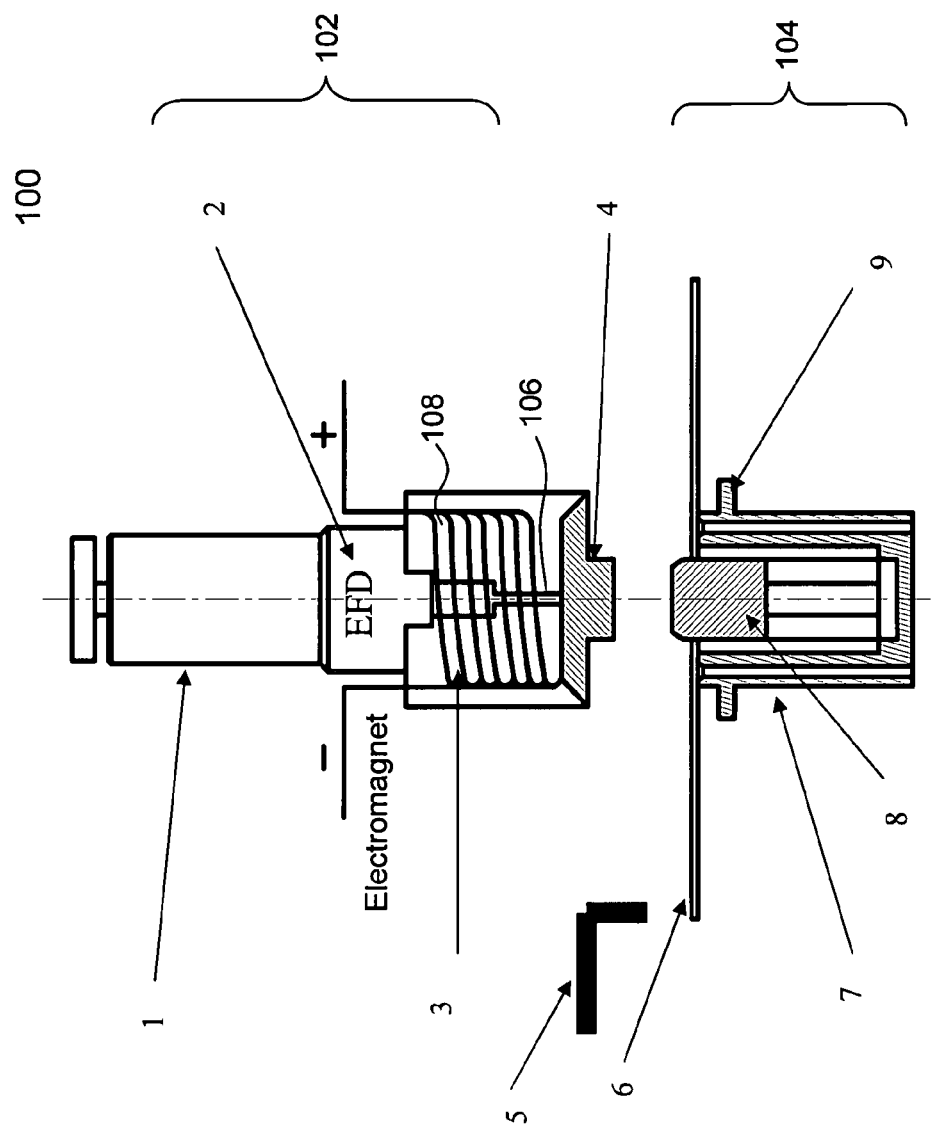
FIG. 1 shows a cross-section view of an exemplary apparatus or configuration in accordance with one embodiment of the present invention.

Referring now to the drawings, in which like numerals refer to like parts throughout the several views. FIG. 1 shows a cross-section view of an exemplary apparatus or configuration 100 in accordance with one embodiment of the present invention. The configuration 100 may be advantageously in a system used to produce Blu-ray discs for carrying or storing digital information. One of the advantages, features and benefits of the configuration 100 is the underlying mechanism that produces a cover layer with uniform thickness of 0.1 mm. According to one embodiment, the material of the cover layer is based on a type of glue or a material that can be in liquid form under a certain condition, where the material, when hardened, is suitable for the blue laser. As used herein, a word "glue" means such a material that can be in liquid form under a certain condition and hardened under another condition.

As shown in FIG. 1, there are two mechanical parts, an upper part 102 and a bottom part 104. The upper part 102 includes a glue dispenser 1 containing a type of glue and a valve 2 to control the delivery of the glue, where the valve 2 is connected to a glue opening or nozzle 106. The upper part 102 further includes a glue dispending cap or structure 4 and means for controlling the glue dispending structure 4. In one embodiment, the means for controlling the glue dispending structure 4 is by an electromagnetic field to grip or release the glue dispending structure 4. It can be understood that by controlling the application of voltage or current, the electromagnetic field generated by the coil 108 can grip or release the glue dispending structure 4 in operation. The bottom part 104 includes a disc positioning structure 8 and magnetic means 9 (e.g., one or more permanent magnets). In one embodiment, a UV light structure 5 is positioned near the edge or outer areas of a disc 6, where the disc 6 is on the disc positioning structure 8 being spun at a predefined speed.

Figure 2C:
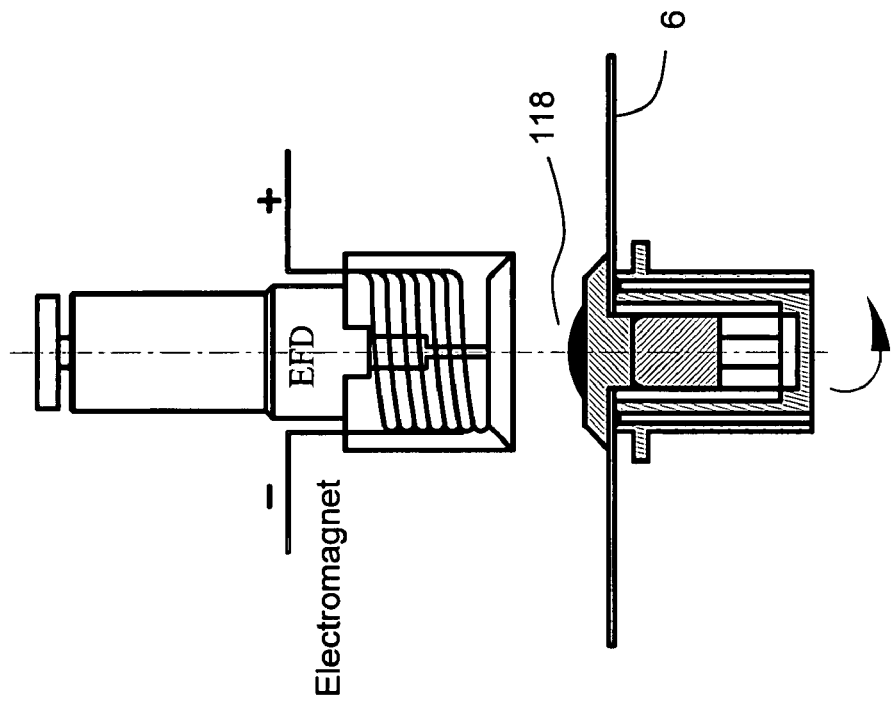

Referring now to FIG. 2A-FIG. 2H, there show respective aspects of the operation of the configuration 100 according to one embodiment. FIG. 2A shows that a molded disk or a disc 110 is loaded or placed onto the bottom part 104. After the disc 104 is positioned on the disc positioning structure 8, the glue dispending structure 4 being gripped by the electromagnetic field is to be engaged with the disc. The upper part 102 and bottom part 104 go towards each other, relatively. In one embodiment, the upper part 102 comes downwards. The extended part 112 of the glue dispending structure 4 pushes the disc positioning structure 8 downwards as shown in FIG. 2B. At same time, the electromagnetic field that grips the glue dispending structure 4 is ceased so as to release the glue dispending structure 4 to engage the disc 6 as shown in FIG. 2C.

Figure 2D:
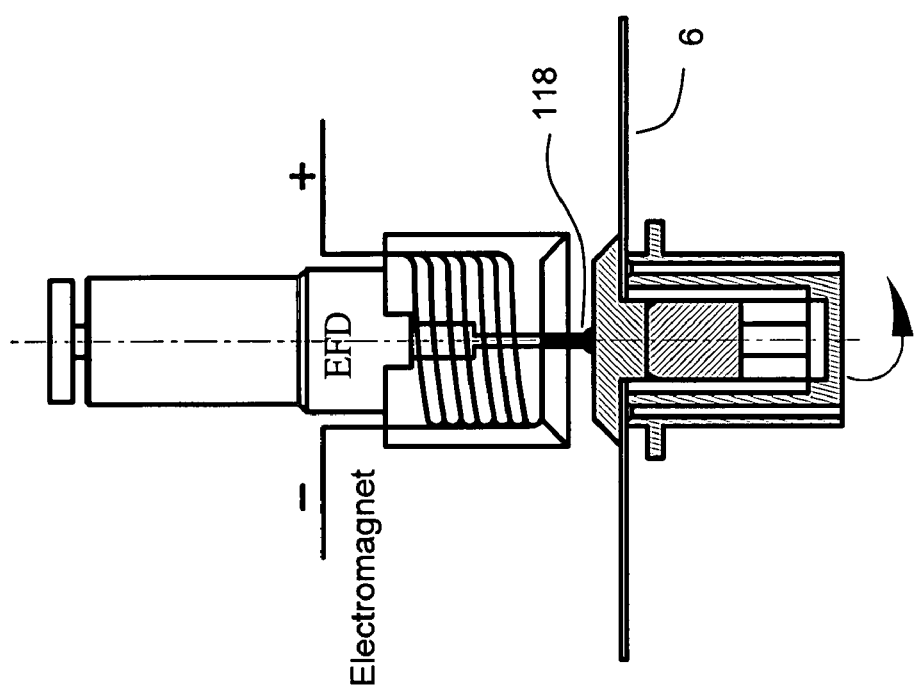

At this moment, the disc is firmly engaged by the glue dispending structure 4. The glue nozzle 106 releases or dispenses a certain amount of glue onto the glue dispending structure 4. FIG. 2D shows that a certain amount of glue 118 has been dispensed on the glue dispending structure 4. Now the bottom part 104 spins or is caused to rotate, thus causing the glue 118 on the glue dispending structure 4 to disperse onto the surface of the disc 6 by a centrifugal force. In one embodiment, depending on the characteristics of the glue, the rotating speed of the bottom part 104 can be controlled so that a predefined thickness (e.g., 0.1 mm) of the glue is evenly dispersed. FIG. 2E shows that the dispended glue on the glue dispending structure 4 has been dispersed on the disc.

Figure 2H:
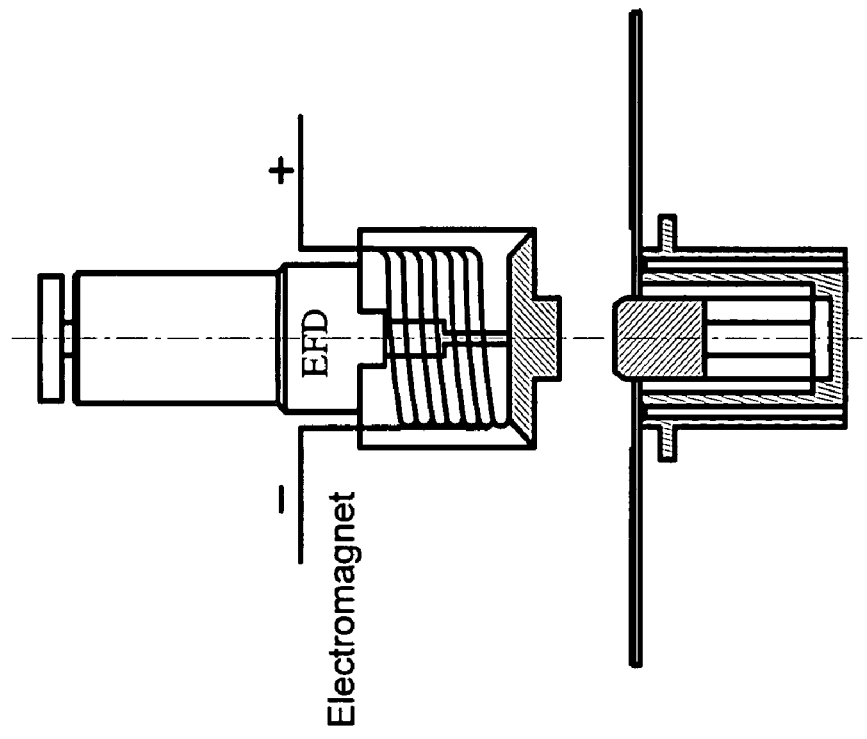
Figure 2G:
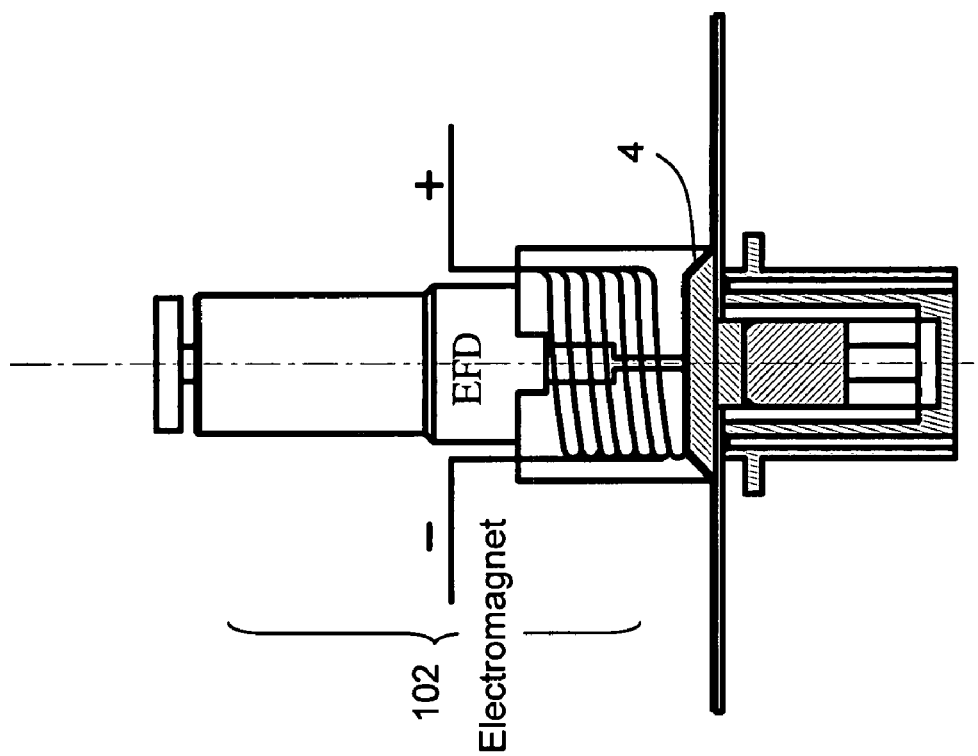
Figure 2I:
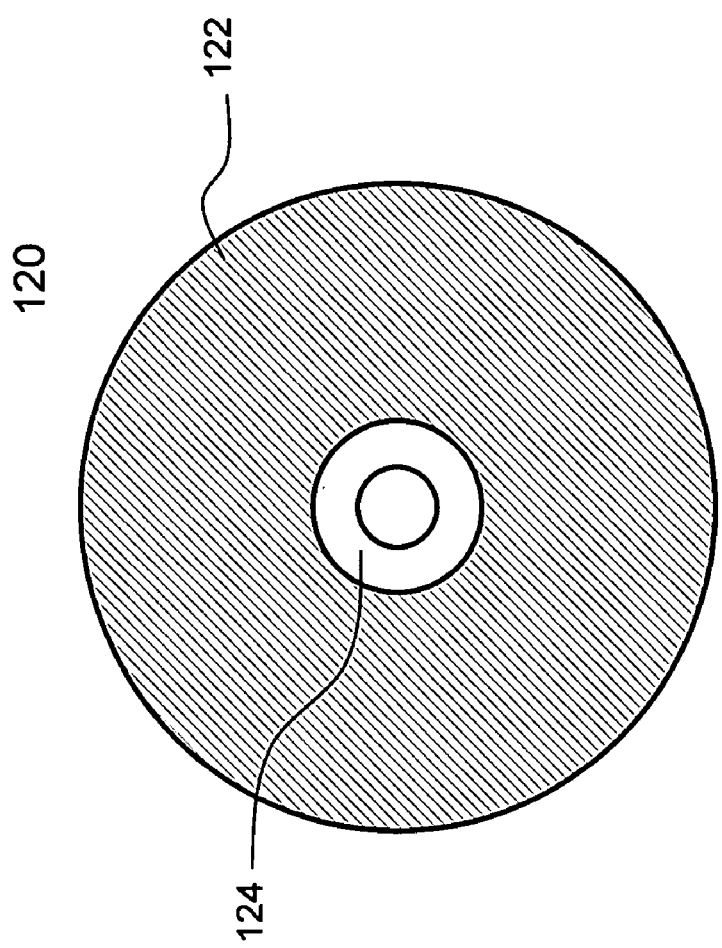
FIG. 2I shows a disc with a produced cover layer.

To prevent the glue on the edge area from shrinking towards the middle of the disc, the UV light structure 5 is positioned around the edge portion of the disc, as shown in FIG. 2F, to cure the glue while the bottom part 104 is still spining. In one embodiment, the UV light structure 5 is positioned about 55-60 mm from the center of the disc. FIG. 2G shows that the upper part 102 comes down to pick up the glue dispending structure 4 by the electromagnetic field. FIG. 2H shows that the glue dispending structure 4 has been gripped back to the upper part 102. Essentially a cycle of providing a cover layer onto a disc is complete. As a result, a disc 120 with a cover layer 122 is produced as shown in FIG. 2I. It should be noted the disc 120 does not have the cover layer 122 across the entire surface. The center portion 124 which is not the data area is not covered by the cover layer 122. The center portion 124 was covered by the glue dispending structure 4 when the cover layer 122 was formed and therefore prevented from being dispersed with a layer of glue.

In operation, to minimize glue residual on the glue dispending structure 4, in one embodiment, a certain amount of air is injected onto the glue dispending structure 4. The glue residual, if any, may be blew off the glue dispending structure 4. On the other end, the air acts as an air buffer or cushion between the glue dispending structure 4 and the upper part 102. FIG. 2J shows that there are air pipes 12 injecting the air onto the glue dispending structure 4. FIG. 2K shows that the air from the air pipes 12 provides an air buffer 126 to avoid the contact of the glue dispending structure 4 with the upper part 102.

FIG. 3A shows an enlarged view of the glue dispending structure 4 that is used in FIG. 2A-FIG. 2K. FIG. 3B shows a second embodiment of the glue dispending structure that may be also be used. The shape of the hollow space 130 in the glue dispending structure matches that of the disc positioning structure 8. FIG. 3C shows a modified glue dispending structure 10 in which a reservoir 132 is provide to reserve an additional amount of glue to ensure that there is sufficient glue to be dispersed evenly onto a disc in accordance with a thickness requirement.

Referring now to FIG. 4A, there shows an embodiment 400 including a heater 402. The embodiment may be understood in conjunction with FIG. 2A-FIG. 2H. The heater 402 is positioned near the disc 6 and operates to control the flow of the glue outwards, when the disc 6 is caused to spin so as to dispense the glue on the glue dispending structure 4 outwards onto the surface of the disc 6. As the glue is moving towards outside, the temperature of the glue may drop rapidly because of the thermal exchange with the air. As a result, the glue may become sticky and be hard to form a cover layer of uniform thickness on the disc 6. By using the heater 402, the desired temperature of the glue can be controlled or retained.

According to one embodiment, the heater 402 is an infrared heater that can be adjusted to radiate infrared beams 404 at one or more wavelengths suitable for being absorbed by the material of the glue. Although the temperature of the glue may drop rapidly when the glue is spun outwards, the temperature of the glue can now be held up by the heater 402 to avoid the glue being sticky. According to another embodiment 410 as shown in FIG. 4B, the heater 412 is configured to control different temperatures across the disc 6. Depending on the characteristics of the glue, the temperature of the glue in the circular regions as shown as 416. The glue in each of the circular regions is kept substantially similar temperature. In operation, the heater 412 radiates infrared beams 414 in different magnitudes respectively corresponding to the circular regions of the disc 6. As a result, the flow of the glue outwards by spinning can be better controlled and subsequently to form a cover layer of uniform thickness on the disc 6.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

We claim:

1. An apparatus for providing a cover layer on an optical disc, the apparatus comprising:

an upper part including a dispensing structure;

a lower part including a disc positioning structure, wherein, when one of the upper part and the lower part is caused to move towards the other one of the upper part and the lower part, the dispensing structure is released to engage the disc placed on the disc positioning structure, a certain amount of material in liquid form at a predefined temperature is dispensed onto the dispensing structure, and wherein the disc is caused to rotate at a predefined speed so that the material is dispersed evenly onto a surface of the disc by a centrifugal force; and a heater employed right above the disc being rotated to control the temperature of the material while being spread outwards from the dispensing structure onto the surface of the disc so that the cover layer of uniform thickness of the material is formed on top of the disc.

2. The apparatus as recited in claim 1, wherein the upper part further includes means for producing an electromagnetic field that, when produced, is strong enough to grip the dispensing structure.

3. The apparatus as recited in claim 2, wherein the lower part includes a magnetic means.

4. The apparatus as recited in claim 3, wherein the electromagnetic field has a more powerful force to retreat the dispensing structure than a force the magnetic means has to hold the dispensing structure.

5. The apparatus as recited in claim 2, wherein the electromagnetic field is turned off to release the dispensing structure when the disc placed on the disc positioning structure needs to be engaged by the dispensing structure.

6. The apparatus as recited in claim 5, wherein the material is dispensed from a nozzle in the upper part onto the dispensing structure.

7. The apparatus as recited in claim 6, wherein the electromagnetic field is turned on to grip the dispensing structure from the disc.

8. The apparatus as recited in claim 2, wherein the upper part includes air pipes to inject air to blow off residuals on the dispensing structure.

9. The apparatus as recited in claim 8, wherein the injected air acts as an air buffer between the dispensing structure and a contact of the upper part.

10. The apparatus as recited in claim 8, wherein the dispensing structure is gripped by the electromagnetic field to the upper part with an air cushion in between.

11. The apparatus as recited in claim 1, wherein the upper part is caused to move towards the lower part or the lower part is caused to move towards the upper part.

12. The apparatus as recited in claim 1, wherein the heater radiates infrared beams at one or more wavelengths suitable for being absorbed by the material.

13. The apparatus as recited in claim 1, wherein the temperature of the material is controlled by the heater to prevent the material in liquid form from being sticky as the material is being dispensed outwards from the dispensing structure onto a surface of the disc.

14. The apparatus as recited in claim 13, wherein the heater is configured to radiate infrared beams in different magnitudes across the disc.

15. The apparatus as recited in claim 13, wherein a temperature for each of circular regions of the discs is controlled by the heater such that the material in each of the circular regions is kept in substantially similar temperature.

16. The apparatus as recited in claim 1, further including means for hardening the material dispersed on the surface of the disc.

17. An apparatus for providing a cover layer in an optical disc, the apparatus comprising:

an upper part including means for producing an electromagnetic field and a dispensing structure, the electromagnetic field, when produced, being strong enough to grip the dispensing structure;

a lower part including a disc positioning structure, wherein, the upper part is caused to move towards the lower part so that the dispensing structure is released to engage the disc placed on the disc positioning structure, a certain amount of glue is then dispensed onto the dispensing structure, and wherein the lower part is caused to rotate at a predefined speed so that the glue is dispersed evenly onto a surface of the disc by a centrifugal force;

a heater employed right above the disc being rotated to control the temperature of the glue as the glue is being dispensed outwards from the dispensing structure onto the surface of the disc so that the glue being kept in an appropriate liquid form and spread in a controlled manner onto the disc; and a UV lighting fixture provided to cure the glue near outer areas of the disc to prevent the glue from shrinking towards a center of the disc.

18. The apparatus as recited in claim 17, wherein the glue is dispensed from a nozzle in the upper part onto the dispensing structure.

19. The apparatus as recited in claim 18, wherein the upper part includes air pipes to inject air to blow off residuals of the glue on the dispensing structure.

20. The apparatus as recited in claim 19, wherein the dispensing structure is gripped by the electromagnetic field to the upper part with an air cushion in between.

21. The apparatus as recited in claim 17, wherein the dispensing structure includes a reservoir to ensure that there is a sufficient amount of the glue to be dispersed onto the surface of the disc.

22. The apparatus as recited in claim 17, wherein the heater radiates infrared beams at one or more wavelengths suitable for being absorbed by the glue.

23. The apparatus as recited in claim 22, wherein the temperature of the glue is controlled by the heater to prevent the glue in liquid form from being sticky.

24. The apparatus as recited in claim 17, wherein the heater is configured to radiate infrared beams in different magnitudes across the disc.

25. The apparatus as recited in claim 24, wherein a temperature of each of circular regions of the discs is controlled by the heater such that the glue in each of the circular regions is kept in substantially similar temperature.

* * * * *